(12) United States Patent
Lin et al.

(10) Patent No.: US 11,941,499 B2
(45) Date of Patent: Mar. 26, 2024

(54) TRAINING USING RENDERED IMAGES

(71) Applicant: Hewlett-Packard Development Company, L.P., Spring, TX (US)

(72) Inventors: Qian Lin, Palo Alto, CA (US); Augusto Cavalcante Valente, Sao Paulo (BR); Deangeli Gomes Neves, Sao Paulo (BR); Guilherme Augusto Silva Megeto, Sao Paulo (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 58 days.

(21) Appl. No.: 17/762,102

(22) PCT Filed: Oct. 16, 2019

(86) PCT No.: PCT/US2019/056536
§ 371 (c)(1),
(2) Date: Mar. 21, 2022

(87) PCT Pub. No.: WO2021/076125
PCT Pub. Date: Apr. 22, 2021

(65) Prior Publication Data
US 2022/0351427 A1   Nov. 3, 2022

(51) Int. Cl.
*G06N 20/00*   (2019.01)
*G06T 7/20*   (2017.01)
(Continued)

(52) U.S. Cl.
CPC ............ *G06N 20/00* (2019.01); *G06T 7/20* (2013.01); *G06T 7/75* (2017.01); *G06T 11/00* (2013.01);
(Continued)

(58) Field of Classification Search
CPC .. G06N 20/20; G06T 7/75; G06T 7/20; G06T 11/00; G06V 20/653; G06V 20/647
(Continued)

(56) References Cited

U.S. PATENT DOCUMENTS 9,892,543 B2    2/2018   Cao
2006/0067573 A1*  3/2006  Parr ..................... G06F 18/00
                                                     382/154
(Continued)

OTHER PUBLICATIONS

Hinterstoisser et al , "Gradient Response Maps for Real-Time Detection of Textureless Objects", IEEE Transactions, Oct. 13, 2011, 876-888, vol. 34, Issue: 5.
(Continued)

*Primary Examiner* — Prabodh M Dharia
(74) *Attorney, Agent, or Firm* — Knobbe, Martens, Olson & Bear, LLP

(57) ABSTRACT

Examples of methods for training using rendered images are described herein. In some examples, a method may include, for a set of iterations, randomly positioning a three-dimensional (3D) object model in a virtual space with random textures. In some examples, the method may include, for the set of iterations, rendering a two-dimensional (2D) image of the 3D object model in the virtual space and a corresponding annotation image. In some examples, the method may include training a machine learning model using the rendered 2D images and corresponding annotation images.

15 Claims, 5 Drawing Sheets

(51) Int. Cl.
*G06T 7/73* (2017.01)
*G06T 11/00* (2006.01)
*G06V 20/64* (2022.01)

(52) U.S. Cl.
CPC .......... *G06V 20/647* (2022.01); *G06V 20/653* (2022.01); *G06T 2200/04* (2013.01); *G06T 2207/20081* (2013.01)

(58) Field of Classification Search
USPC .......................... 345/418, 419, 427; 382/154
See application file for complete search history.

(56) References Cited

U.S. PATENT DOCUMENTS

| | | | | |
|---|---|---|---|---|
| 2010/0086200 | A1* | 4/2010 | Stankiewicz | G06V 10/462 |
| | | | | 382/154 |
| 2012/0139906 | A1* | 6/2012 | Zhang | G06T 19/006 |
| | | | | 345/419 |
| 2015/0269785 | A1* | 9/2015 | Bell | G06T 13/80 |
| | | | | 345/427 |
| 2016/0086373 | A1* | 3/2016 | Vesely | G09G 3/003 |
| | | | | 345/419 |
| 2016/0196665 | A1* | 7/2016 | Abreu | G06T 11/00 |
| | | | | 345/427 |
| 2017/0287137 | A1* | 10/2017 | Lin | G06V 10/454 |
| 2018/0276882 | A1* | 9/2018 | Harviainen | G06T 19/006 |
| 2019/0180082 | A1 | 6/2019 | Moravec et al. | |
| 2019/0228495 | A1 | 7/2019 | Tremblay et al. | |
| 2019/0228587 | A1* | 7/2019 | Mordvintsev | G06T 19/20 |

OTHER PUBLICATIONS

Hinterstoisser et al., "Model Based Training, Detection and Pose Estimation of Texture-Less 3D Objects in Heavily Cluttered Scenes", ACCV'12 Proceedings—vol. Part I, Nov. 2012.

* cited by examiner

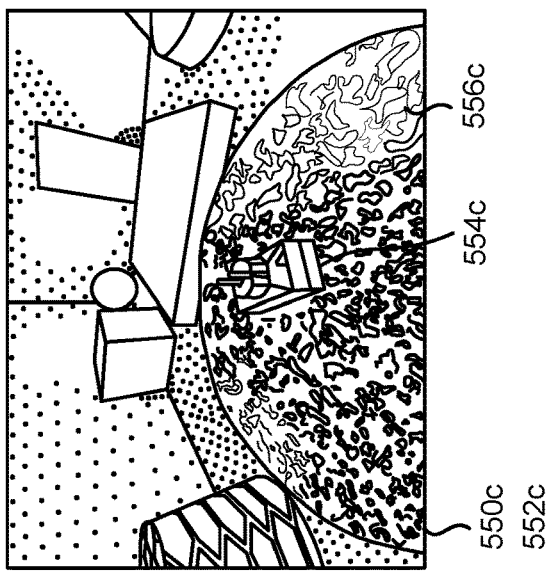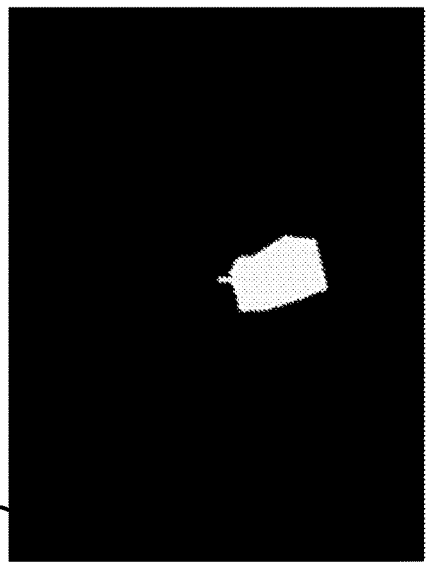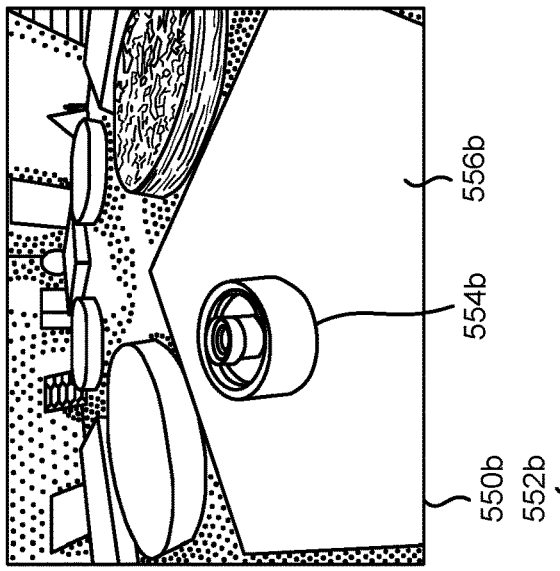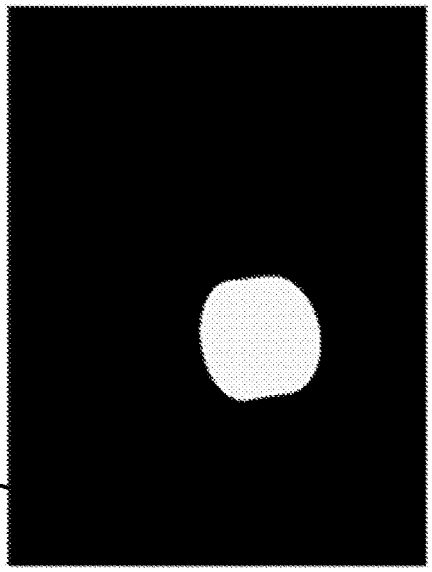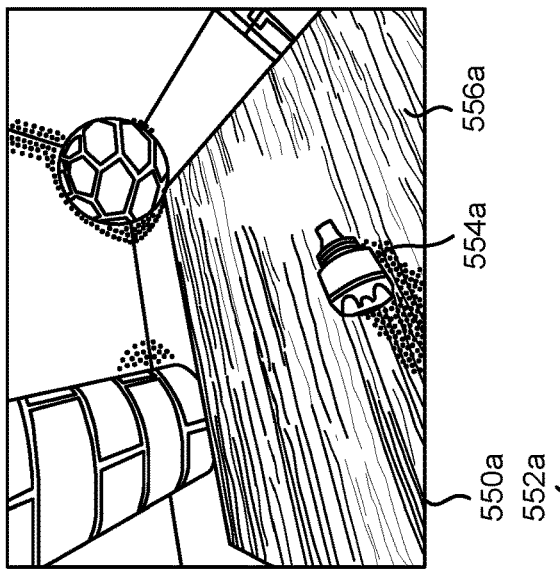
FIG. 5

TRAINING USING RENDERED IMAGES

BACKGROUND

The use of electronic devices has expanded. Computing devices are a kind of electronic device that includes electronic circuitry for performing processing. As processing capabilities have expanded, computing devices have been utilized to perform more functions. For example, a variety of computing devices are used for work, communication, and entertainment. Computing devices may be linked to a network to facilitate communication between computing devices.

BRIEF DESCRIPTION OF THE DRAWINGS

FIG. 5 is a diagram illustrating examples of 2D images and corresponding annotation images.

DETAILED DESCRIPTION

Figure 1:
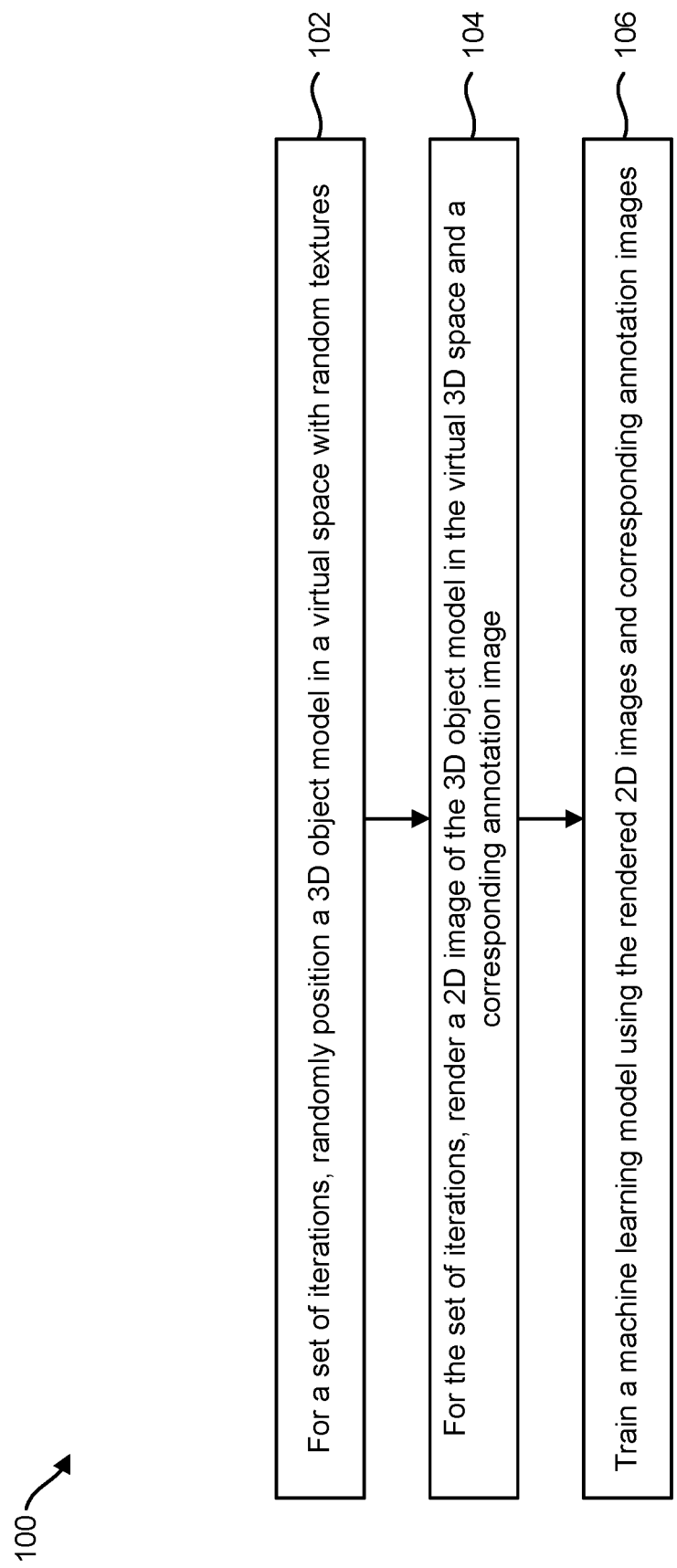
FIG. 1 is a flow diagram illustrating an example of a method for training using rendered images.

Machine learning is a technique where a machine learning model is trained to perform a task based on a set of examples (e.g., data). Deep learning is an example of machine learning that utilizes artificial neural networks. Some deep learning-based object detection techniques use thousands of examples per object type for training. It may be difficult to train machine learning models such as object detectors for custom object types (e.g., industrial parts). For example, building a dataset for training may include manually taking numerous images of the custom object types and manually annotating the images with the object location. Manually annotating objects in images may be very time consuming for pixel-wise detection (e.g., segmentation), as the object contour may have to be carefully drawn. For instance, building a training dataset can take weeks or months.

Some examples of the techniques described herein may synthetically generate images for machine learning model training. Synthetically generating images may be beneficial by reducing the difficulty in obtaining a dataset for machine learning model training.

Throughout the drawings, identical reference numbers may designate similar, but not necessarily identical, elements. Similar numbers may indicate similar elements. When an element is referred to without a reference number, this may refer to the element generally, without necessary limitation to any particular drawing figure. The drawing figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a flow diagram illustrating an example of a method 100 for training using rendered images. The method 100 and/or a method 100 element or elements may be performed by an apparatus (e.g., electronic device, computing device, server, etc.). For example, the method 100 may be performed by the apparatus 302 described in connection with FIG. 3.

The apparatus may, for a set of iterations, randomly position 102 a three-dimensional (3D) object model in a virtual space with random textures. A 3D object model is a 3D model of an object. For example, a 3D object model may be a virtual geometrical model of an object in three dimensions. A 3D object model may be expressed as a set of points, a set of polygons, a mesh or meshes, etc., in three dimensions. Examples of 3D object models may include 3D computer aided design (CAD) models. For instance, 3D CAD models may be available for objects in an industrial context (e.g., manufacturing). A 3D object model may be textureless or textured. In some examples, the 3D object model(s) may correspond to object(s) to be detected and/or recognized by a machine learning model.

A virtual space is a representation of a 3D volume or space. For example, a virtual space may be a computer-generated space that may represent or depict an environment (e.g., scene, room, landscape, etc.). A virtual space may include a surface or surfaces (e.g., virtual floors, tables, ground, face of a virtual object, outer portion of a virtual object, etc.) and/or virtual objects (e.g., shapes, volumes, virtual furniture, etc.). In some examples, the virtual space may be a virtual scene, such as an indoor or outdoor environment. In some examples, an indoor or outdoor environment may be selected based on a received input indicating an indoor or outdoor environment or may be randomly selected.

In some examples, the apparatus may generate, build, and/or obtain the virtual space. For example, the apparatus may include instructions for generating, building, and/or obtaining the virtual space. In some examples, the virtual space may include multiple (e.g., 2, 3, 4, 5, 7, 10, etc.) surfaces and/or multiple objects. For instance, the virtual space may include distractor objects. A distractor object is an object in the virtual space separate from the 3D object model(s). For instance, a distractor object may be used to distract from the 3D object model(s) targeted for detection and/or recognition. In some examples, the virtual space may have some similarity to an environment from which the machine learning model is to perform computer vision tasks (e.g., object detection, object recognition, image segmentation, image classification, etc.). In some examples, the virtual space may be varied. In some examples, the virtual space may be predetermined and/or reused for multiple 3D object models. In some examples, the virtual space may be selected from a set of virtual spaces (e.g., a set of predetermined virtual spaces).

A texture is an appearance or structure of surface. For example, a texture of a surface may be an optical pattern on a surface. For instance, a texture may provide an appearance of smoothness, roughness, optical pattern, etc., on a surface and/or virtual object. A random texture is a texture that is selected randomly. For example, a virtual space with random textures is a virtual space in which a surface or surfaces have textures that have been randomly selected. In some examples, the apparatus may randomly select textures for the virtual space using a random number generator. For instance, the apparatus may generate a random number that may be mapped to a selection of a set of textures. In some examples, the apparatus may receive data from an input device or remote device indicating a set of textures from which the random selection may be performed.

Randomly positioning 102 the 3D object model may include locating the 3D object model in the virtual space at a random position. For example, the apparatus may generate a random set of coordinates for the 3D object model in the virtual space and position the 3D object model at the random set of coordinates. In some examples, multiple 3D objects may be positioned 102 in the virtual space. In some examples, the 3D object model(s) may be set as invisible and/or located (e.g., gathered) out of view (e.g., in the virtual space and outside of a field of view) before positioning 102.

An iteration is an instance of a procedure. For example, performing a procedure for a set of iterations may include performing the procedure for each of the iterations (e.g., N times). The apparatus may randomly position 102 the 3D object model in the virtual space for the set of iterations. For example, the apparatus may randomly generate a set of coordinates for the 3D object model for each iteration and place the 3D object model at the random set of coordinates.

The apparatus may, for the set of iterations, render 104 a two-dimensional (2D) image of the 3D object model in the virtual space and a corresponding annotation image. For example, the apparatus may perform graphics processing to render the 2D image of the 3D object model in the virtual space. In some examples, rendering 104 may include performing processing such as executing a shader or shaders (e.g., pixel shader, vertex shader, geometry shader, and/or tessellation shader, etc.), computing lighting effects, performing clipping, and/or rasterizing the 3D object model and the virtual space to produce the 2D image.

An annotation image is an image that indicates a region of the 2D image where the 3D object model is depicted. For example, an annotation image may be a 2D image that includes one color (e.g., white) for the region where the 3D object model is depicted and another color (e.g., black) where the 3D object model is not depicted. For instance, pixels that depict the 3D object model may be rendered in one color (e.g., white), and pixels that do not depict the 3D object model may be rendered in another color (e.g., black.) In some examples, rendering 104 a corresponding annotation image may include designating or labeling pixels corresponding to the 3D object model. For example, a routine or shader may be executed that marks pixels of the 3D object model in a first color and/or that marks other pixels in a second color that is different from the first color.

Rendering 104 the 2D image and the corresponding annotation image may produce a set of pixels for the 2D image and a set of pixels for the annotation image. In some examples, the 2D image and the annotation image may have the same dimensions and/or same amounts of pixels.

The apparatus may train 106 a machine learning model using the rendered 2D images and corresponding annotation images. A machine learning model is a structure that learns based on training. For example, a machine learning model may be trained with the rendered 2D images and corresponding annotation images to perform image classification and/or object detection. Examples of machine learning models may include artificial neural networks (e.g., deep neural networks, convolutional neural networks (CNNs), region-based convolutional neural networks (R-CNNs), mask R-CNNs, etc.), support vector machines, decision trees, etc. Training 106 the machine learning model may include adjusting a weight or weights of the machine learning model. For example, a neural network may include a set of nodes, layers, and/or connections between nodes. The nodes, layers, and/or connections may have associated weights. The weights may be adjusted to train the neural network to perform a function, such as computer vision (e.g., object detection, image classification, etc.).

In some examples, a trained machine learning model may be utilized to perform object detection. For instance, a machine learning model may be utilized to detect objects in images (e.g., real-world images of real-world objects captured with a camera), where similar virtual objects may have been depicted in the rendered 2D images. In some examples, a trained machine learning model may be utilized to perform image classification based on the training. In some examples, the apparatus may utilize the trained machine learning model to perform a computer vision task (e.g., object detection, image segmentation, object recognition, image classification, etc.). In some examples, the apparatus may send the trained machine learning model to another device or devices to perform a computer vision task (e.g., object detection, image segmentation, object recognition, image classification, etc.).

Figure 2:
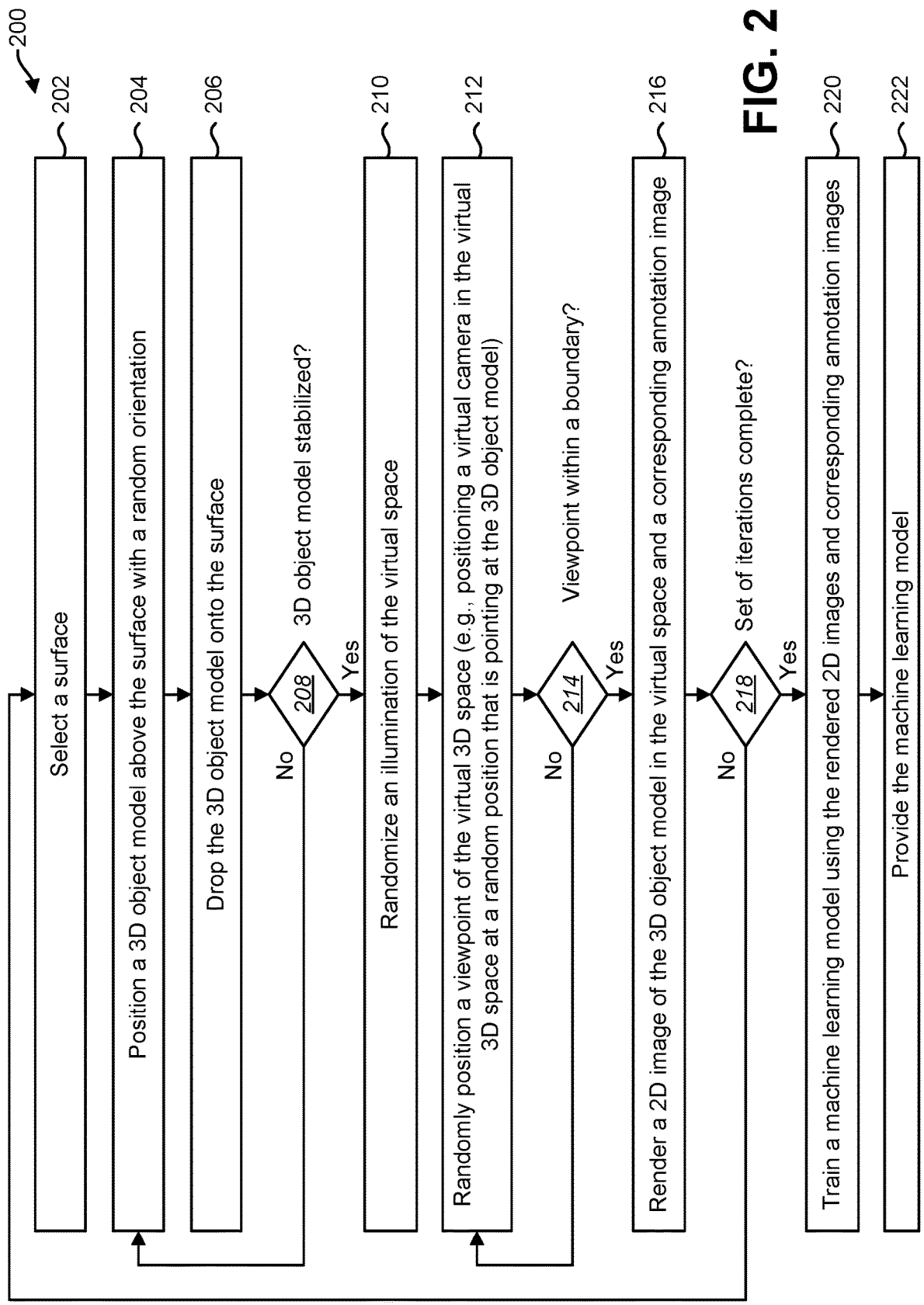
FIG. 2 is a flow diagram illustrating an example of a method for training using rendered images.

FIG. 2 is a flow diagram illustrating an example of a method 200 for training using rendered images. The method 200 and/or a method 200 element or elements may be performed by an apparatus (e.g., electronic device, computing device, server, etc.). For example, the method 200 may be performed by the apparatus 302 described in connection with FIG. 3. In some examples, the method 200 or element(s) thereof described in connection with FIG. 2 may be an example of the method 100 or element(s) thereof described in connection with FIG. 1. In some examples, an element or elements of the method 200 may be omitted or combined.

The apparatus may select 202 a surface. For example, a virtual space may include multiple surfaces (e.g., a floor, platforms, tables, etc.). The apparatus may select 202 one of the surfaces. In some examples, the apparatus may randomly select a surface (e.g., a horizontal surface). For example, the apparatus may generate a random number and map the random number to one of the multiple surfaces. In some examples, the apparatus may select a surface from a set (e.g., list) of surfaces. In some examples, the set of surfaces may be based on a received input that specifies the surfaces.

The apparatus may position 204 a 3D object model above the surface with a random orientation. For example, the apparatus may position 204 the 3D object model at a distance above the surface, where the 3D object is positioned in a randomly selected orientation. In some examples, the apparatus may randomly generate an orientation value or values. For instance, the apparatus may generate random values for a yaw, pitch, and/or roll of the 3D object model. In some examples, the distance above the surface may be randomly selected, may be predetermined, or may be based on a received input that indicates the distance. In some examples, the 3D object model may be centered above the surface or may be positioned off-center above the surface.

The apparatus may drop 206 the 3D object model onto the surface. For example, the virtual space may be modeled or simulated with a force that may cause the 3D object model to fall to the surface. In some examples, the force may be a simulated gravitational force with an adjustable magnitude or an attractive force between the 3D object model and the surface. For instance, the apparatus may compute (e.g., simulate) the 3D object model dropping onto the surface. In some examples, the dropping 206 may be performed using a physics engine for the virtual space, which may result in a realistic positioning for the 3D object model on the surface.

The apparatus may determine 208 whether the 3D object model is stabilized. For example, the apparatus may determine whether the 3D object model has come to rest on the surface. For instance, the apparatus may determine if the velocity of the 3D object model is 0 (e.g., 0 for an amount of time). In some examples, determining 208 that the 3D object model is stabilized may be performed before rendering a 2D image of the 3D object model. In some examples, if the 3D object model is not stabilized, the apparatus may wait for a period and re-check whether the 3D object model is stabilized. The 3D object model may not be stabilized if the 3D object model has not been at rest (e.g., at rest for an amount of time). In some examples, the amount of time may be 1 second, 2 seconds, 5 seconds, etc. In some examples, the amount of time may be a simulated amount of time, where the simulated amount of time is shortened relative to real-world time. For instance, 1 second of simulated time may occur in 1 microsecond in real-world time.

In some examples, determining 208 whether the 3D object model is stabilized may include determining whether the 3D object model is on the surface. For instance, simulating the 3D object model drop may cause the 3D object model to fall off of the surface in some cases. The 3D object model may not be stabilized if the 3D object model is not on the surface in some examples. In some examples, the 3D object model may not be stabilized if the 3D object model is not on the surface or if the 3D object model is not at rest (e.g., at rest for a period of time). In some examples, the apparatus may simulate a transparent barrier to prevent the 3D object model from falling off of the surface. In a case that the 3D object model is not stabilized, the apparatus may return to positioning 204 the object model and dropping 206 the object model.

In a case that the 3D object model is stabilized, the apparatus may randomize 210 an illumination of the virtual space. In some examples, randomizing an illumination of the virtual space may include randomly selecting a number of light sources in the virtual space, randomly selecting positioning of the light source(s) in the virtual space, randomly selecting color(s) of the light source(s) in the virtual space, and/or randomly selecting brightness of the light source(s) in the virtual space. For instance, the apparatus may generate random values for number of light sources, coordinates of light source(s), orientation of light source(s), color(s) of light source(s), and/or brightness(es) of light source(s) in the virtual space. In some examples, the apparatus may receive data from an input device or remote device indicating illumination settings and/or a set of lighting parameters from which the random selection may be performed.

The apparatus may randomly position 212 a viewpoint of the virtual 3D space. A viewpoint is a position and/or orientation of a view of the virtual space. For example, the apparatus may randomly generate coordinate values and/or orientation (e.g., yaw, pitch, roll) values for the viewpoint. In some examples, randomly positioning 212 the viewpoint may be constrained such that the 3D object model is within the view from the viewpoint.

In some examples, randomly positioning 212 the viewpoint may include positioning a virtual camera in the virtual space at a random position that is pointing at the 3D object model. A virtual camera is a simulated camera with a field of view in the virtual space. For instance, the apparatus may randomly select a position and orientation for the virtual camera from a set of potential positions and orientations (e.g., ranges) from which the 3D object is within the field of view of the camera. In some examples, the virtual camera may be positioned 212 with a camera-to-object distance, which may be predetermined, indicated by a received input, or selected from a range.

The apparatus may determine 214 whether the viewpoint (e.g., virtual camera) is within a boundary. A boundary is an edge or border of the virtual space. For example, the apparatus may determine whether the viewpoint (e.g., virtual camera) is within coordinate ranges of the virtual space. In some examples, the apparatus may determine whether the viewpoint (e.g., virtual camera) is outside of coordinate ranges of an object or objects in the virtual space. For instance, the apparatus may ensure that the viewpoint (e.g., virtual camera) is in a position where the view (e.g., field of view) of the 3D object model is unobstructed by a boundary of the virtual space and/or by a boundary of an object in the virtual space. In a case that the viewpoint is not within the boundary or boundaries, the apparatus may return to randomly positioning 212 the viewpoint (e.g., virtual camera). In a case that the viewpoint is within the boundary or boundaries and/or that the view of the 3D object model is unobstructed, the viewpoint (e.g., virtual camera) may be determined to be validated. In some examples, validating that the virtual camera is within the boundary or boundaries (and/or that the view of the 3D object model is unobstructed) may be performed before rendering the 2D image. In some examples, the apparatus may receive data from an input device or remote device indicating viewpoint positioning and/or a set of viewpoint positioning parameters (e.g., distances, distance ranges, etc.) from which the random selection may be performed.

In a case that the viewpoint is within the boundary or boundaries (e.g., if the viewpoint is validated), the apparatus may render 216 a 2D image of the 3D object model in the virtual space and a corresponding annotation image. In some examples, the rendering 216 may be performed as described in relation to FIG. 1. The rendered 2D image and corresponding annotation image may be stored in memory.

The apparatus may determine 218 whether a set of iterations is complete. In some examples, the apparatus may utilize a threshold number (e.g., N, 1,000, 1,300, 1,500, 2,000, 5,000, 10,000, etc.) to determine 218 whether the set of iterations is complete. For instance, the apparatus may increment a counter for each iteration. The set of iterations may be determined 218 to be complete when the counter reaches the threshold number. Other approaches may be utilized (e.g., decrementing a counter from a target number of iterations to 0, etc.). In a case that the set of iterations is not complete, the apparatus may perform another iteration (e.g., return to selecting 202 a surface).

In a case that the set of iterations is complete, the apparatus may train 220 a machine learning model using the rendered 2D images and corresponding annotation images. In some examples, the training 220 may be performed as described in relation to FIG. 1.

The apparatus may provide 222 the machine learning model. For example, the apparatus may store the trained machine learning model in memory and/or may send the trained machine learning model to another device. For instance, the machine learning model may be provided as an executable program and/or through a web service (e.g., a program available over a network). In some examples, the apparatus may provide a web service. For example, the apparatus may provide a web service for producing machine learning models for computer vision (e.g., object detection, image classification, etc.). The apparatus may be one apparatus in a group of apparatuses (e.g., web servers) that provide the web service. In some examples, the web service may provide the trained machine learning model to another device (e.g., a client device over a network, such as a local area network (LAN) and/or the Internet).

In some examples, the apparatus may utilize a 3D object model or 3D object models as an input. For example, the 3D object model or 3D object models may be a single input type for producing the machine learning model. In some examples, other inputs may be utilized. For example, a number of iterations, surface textures, type of machine learning model, and/or machine learning model objective (e.g., object detection, image classification, etc.) may be another input or inputs that may be received and/or utilized. In some examples, manually captured training images and/or training images of real-world scenes may not be inputs to the machine learning model production.

In some examples, the method 200 may be performed for a set of 3D object models (e.g., list of 3D object models). For instance, a set of iterations may be performed for each of the set of 3D object models. In some examples, when the set of iterations for a 3D object model is complete, another set of iterations may be performed for a next 3D object model. In some approaches, the 3D object model may be randomly selected from the set of 3D object models for each iteration. In some examples, the set of 3D object models may be based on a received input (via a network and/or from an input device). In some examples, the 3D object model may be removed from a view (e.g., field of view) after rendering 216 the 2D image of the 3D object model and the corresponding annotation image for each iteration.

In some examples, multiple 3D object models may be positioned in the virtual space. For example, multiple 3D object models may be dropped 206 onto a surface and a 2D image may be rendered 216 that includes the multiple 3D object models. When multiple 3D object models are utilized concurrently, a 3D object model or models may become occluded in the 2D image. The occlusion may improve robustness when utilized to train 220 the machine learning model. In some examples, the multiple 3D object models may be positioned closely together (e.g., with a separation of 1 inch, 2 inches, 3 inches, etc.) in the virtual space before dropping 206.

Figure 3:
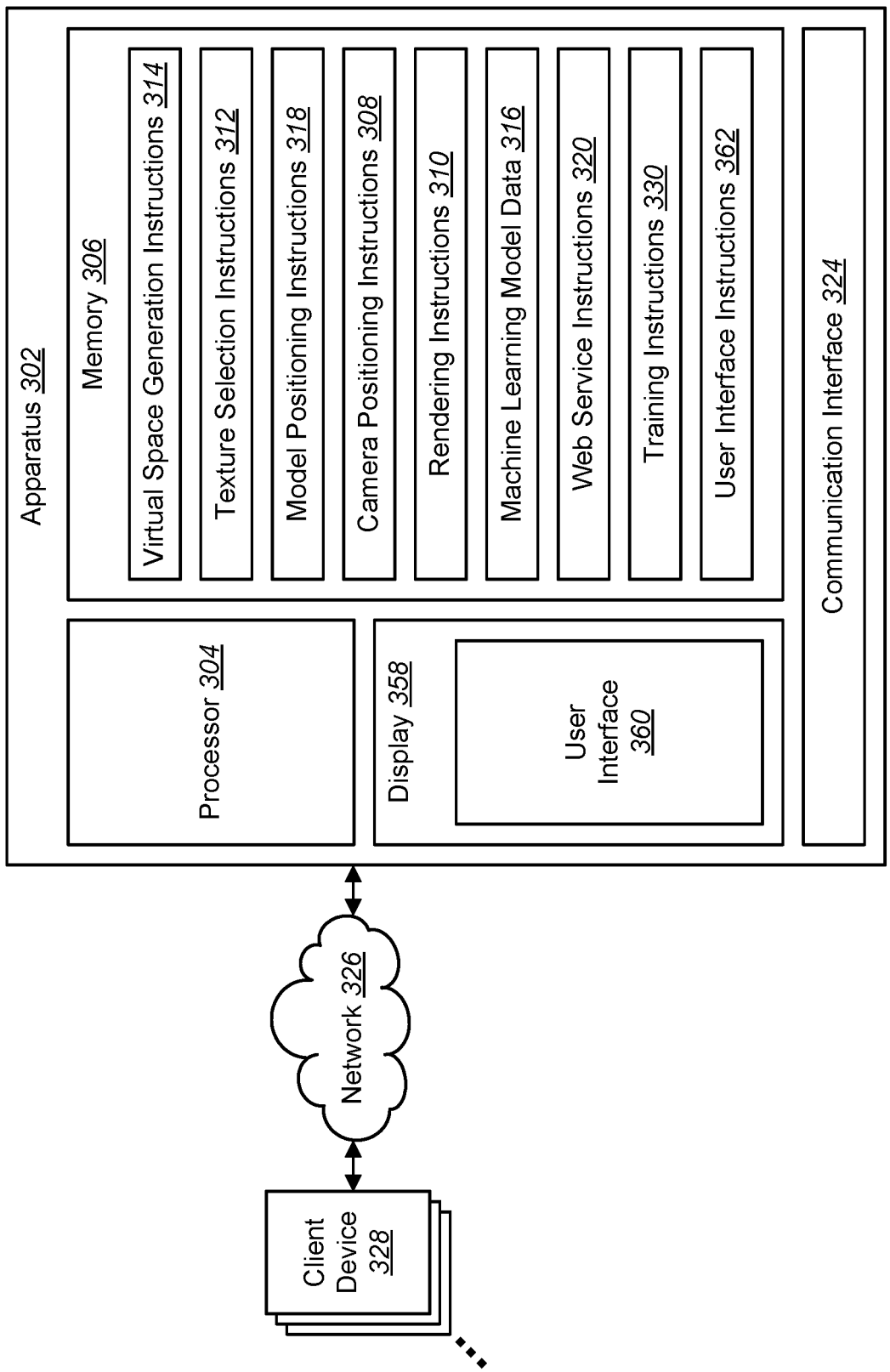
FIG. 3 is a block diagram of an example of an apparatus that may be used in training using rendered images.

FIG. 3 is a block diagram of an example of an apparatus 302 that may be used in training using rendered images. The apparatus 302 may be an electronic device, such as a personal computer, a server computer, a smartphone, a tablet computer, etc. In some examples, the apparatus 302 may be included in a group of apparatuses (e.g., a server farm). The apparatus 302 may include and/or may be coupled to a processor 304 and/or a memory 306. The apparatus 302 may include additional components (not shown) and/or some of the components described herein may be removed and/or modified without departing from the scope of this disclosure.

The processor 304 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. In some examples, the processor 304 may include multiple processors (e.g., a CPU and a GPU). The processor 304 may fetch, decode, and/or execute instructions stored in the memory 306. In some examples, the processor 304 may include an electronic circuit or circuits that include electronic components for performing a function or functions of the instructions. In some examples, the processor 304 may be implemented to perform one, some, or all of the functions, operations, elements, methods, etc., described in connection with one, some, or all of FIGS. 1-5.

The memory 306 may be any electronic, magnetic, optical, or other physical storage device that contains or stores electronic information (e.g., instructions and/or data). The memory 306 may be, for example, Random Access Memory (RAM), Electrically Erasable Programmable Read-Only Memory (EEPROM), a storage device, an optical disc, and/or the like. In some examples, the memory 306 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some implementations, the memory 306 may be a non-transitory tangible machine-readable storage medium, where the term "non-transitory" does not encompass transitory propagating signals. In some examples, the memory 306 may include multiple devices (e.g., a RAM card and a solid-state drive (SSD)).

In some examples, the apparatus 302 may include a communication interface 324 through which the processor 304 may communicate with an external device or devices (e.g., client device(s) 328). In some examples, the apparatus 302 may be in communication with (e.g., coupled to, have a communication link with) a remote client device 328 or remote client devices 328 via a network 326. Examples of the client device(s) 328 may include computing devices, desktop computers, laptop computers, smart phones, tablet devices, game consoles, etc. Examples of the network 326 may include a local area network (LAN), wide area network (WAN), the Internet, cellular network, Long Term Evolution (LTE) network, 5G network, etc.

The communication interface 324 may include hardware and/or machine-readable instructions to enable the processor 304 to communicate with the external device or devices. The communication interface 324 may enable a wired and/or wireless connection to the external device or devices. In some examples, the communication interface 324 may include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions and/or data into the apparatus 302. In some examples, the memory 306 of the apparatus 302 may store virtual space generation instructions 314, texture selection instructions 312, model positioning instructions 318, camera positioning instructions 308, rendering instructions 310, machine learning model data 316, web service instructions 320, training instructions 330, and/or user interface instructions 362.

In some examples, the processor 304 may execute the virtual space generation instructions 314 to generate a virtual space. For example, the processor 304 may instantiate a virtual space with dimensions, surfaces, objects, and/or physics. In some examples, an aspect or aspects (e.g., dimensions, surfaces, objects, and/or physics) of the virtual space may be predetermined or selected based on a received input that specifies the aspect or aspects.

In some examples, the processor 304 may execute the texture selection instructions 312 to randomly select a texture for a surface in the virtual space. In some examples, randomly selecting the texture for a surface may be accomplished as described above.

In some examples, the processor 304 may execute the model positioning instructions 318 to randomly position a 3D object model on the surface. In some examples, randomly positioning the 3D object model may be accomplished as described above. For instance, the processor may randomly position the 3D object model on the surface by calculating a fall of the 3D model onto the surface from a random orientation above the surface.

In some examples, the processor 304 may execute the camera positioning instructions 308 to determine a position of a camera in the 3D virtual space with a field of view that includes the 3D object model. In some examples, determining the position of the camera may be accomplished as described above. For instance, the processor 304 may determine the position of the camera by randomly selecting the position of the camera within a predetermined range from the position of the 3D object model.

In some examples, the processor 304 may execute the rendering instructions 310 to render a 2D image from the position of the camera. In some examples, rendering the 2D image from the position of the camera may be accomplished as described above. For instance, the processor 304 may render the 2D image within the field of view of the camera.

In some examples, the processor 304 may execute the rendering instructions 310 to render an annotation image that indicates a location of the 3D object model in the 2D image. In some examples, rendering the annotation image may be accomplished as described above. For instance, the processor 304 may render the annotation image with a color for pixels where the 3D object model is depicted in the 2D image.

In some examples, the processor 304 may execute the training instructions 330 to train a machine learning model using the 2D image and the annotation image. In some examples, training the machine learning model may be accomplished as described above. For instance, the processor 304 may store and/or adjust weights of the machine learning model in the machine learning model data 316. The machine learning model data 316 may indicate or specify a machine learning model or machine learning models.

In some examples, the processor 304 may execute the web service instructions 320 to provide a web service. In some examples, the web service may be provided as described above. For example, the apparatus 302 may execute the web service instructions 320 to receive a 3D object model or 3D object models from a client device 328 or client devices 328. In some examples, 2D images and annotation images may be generated without other inputs. In some examples, the apparatus 302 may also receive other inputs (e.g., options, settings, etc.) from the client device(s) 328 for generating 2D images and annotation images, and/or for training a machine learning model. The processor 304 may generate a set of 2D images and annotation images and train the machine learning model as described. In some examples, the processor 304 may execute the web service instructions 320 to provide (e.g., send) the trained machine learning model to a client device 328 or client devices 328. For instance, the trained machine learning model(s) may be distributed to client devices 328 such as industrial inspection systems, robots, mobile phones with inference software, etc. In some examples, the client devices may be used to perform 3D object recognition tasks (e.g., object detection, image classification, etc.).

In some examples, the processor 304 may execute the user interface instructions 362 to produce a user interface. A user interface is an interactive graphic or image. For example, a user interface may be a graphical user interface (GUI) with controls, fields, etc., that may enable interaction between a user and a device (e.g., client device 328 and/or apparatus 302). The user interface may be produced for local and/or remote presentation. For instance, the apparatus 302 may include a display 358 and/or may be linked to a display 358. In some examples, the processor 304 may execute the user interface instructions 362 to produce a user interface 360, which may be presented on the display 358. In some examples, the processor 304 may execute the user interface instructions 362 to produce a user interface for a remote device (e.g., client device 328). For instance, the apparatus 302 may send data (e.g., web page data) to present the user interface remotely.

In some examples, a user may interact with a user interface by using an input device or devices. For example, the apparatus 302, a client device, or another device on which a user interface is presented may include and/or may be linked to an input device or devices. Examples of input devices include a mouse, touch screen, controller, touch pad, stylus, microphone, camera, etc. For instance, the apparatus 302, client device 328, or another device on which a user interface is presented may receive input from the input device and utilize the input for interaction with the user interface.

In some examples, the user interface (e.g., user interface 360) may include a control or controls that enable interacting with settings for generating the 2D images and/or the annotation images. Examples of controls may include buttons, radio buttons, text boxes, dialog boxes, etc. The controls may be utilized to set and/or change a setting or settings for generating the 2D images and/or the annotation images. Examples of settings that may be set and/or adjusted may include 3D object model settings, surface settings, texture settings, viewpoint settings, 3D object model position settings, lighting settings, number of iteration settings, indoor or outdoor environment settings, camera-to-object distance settings, etc. For instance, the control or controls on the user interface may enable selecting a 3D object model, selecting a number of 3D object models for inclusion in the virtual space, selecting a surface, establishing a set of surfaces (e.g., round tables, rectangular tables, floors, boxes, crates, etc.), selecting a texture, establishing a set of textures, selecting a viewpoint, establishing viewpoint parameters (e.g., distance range(s), angle range(s), etc.), 3D object model position selection, 3D object model orientation selection, 3D object model orientation parameters (e.g., yaw range, pitch range, roll range), drop height selection, drop height range, lighting selection, number of light sources, lighting color(s), range for number of light sources, color range(s), lighting positioning range(s), selecting number of iterations (e.g., number of 2D images and/or annotation images to produce), selecting an indoor or outdoor environment for the virtual space, selecting a virtual space, selecting camera-to-object distance, setting camera-to-object distance range, gravitational magnitude, stabilization time, etc. For example, a control or controls of the user interface may be utilized to directly select a parameter or parameters described herein (e.g., override random selection) and/or may be utilized to establish a set and/or range from which random selection may occur (e.g., set of textures, set of lighting, range of camera-to-object distance, range of drop height, etc.).

Figure 4:
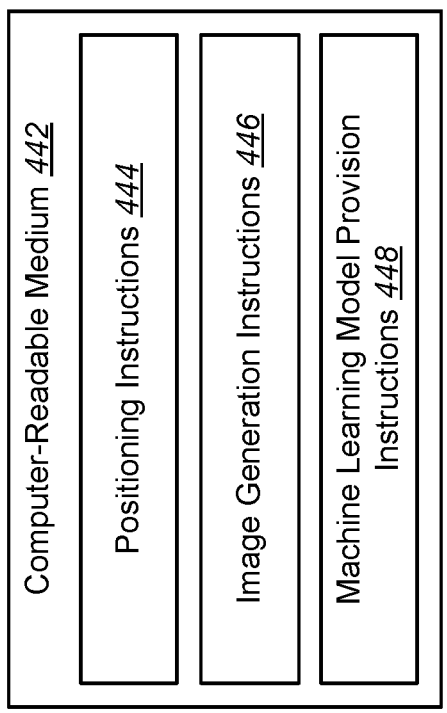
FIG. 4 is a block diagram illustrating an example of a computer-readable medium for training using rendered images.

FIG. 4 is a block diagram illustrating an example of a computer-readable medium 442 for training using rendered images. The computer-readable medium is a non-transitory, tangible computer-readable medium 442. The computer-readable medium 442 may be, for example, RAM, EEPROM, a storage device, an optical disc, and the like. In some examples, the computer-readable medium 442 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 442 described in connection with FIG. 4.

The computer-readable medium 442 may include code (e.g., data and/or instructions). In some examples, the code may include executable code. For example, the computer-readable medium 442 may include positioning instructions 444, image generation instructions 446, and/or machine learning model provision instructions 448.

The positioning instructions 444 include code to cause a processor to drop a virtual 3D object from a random orientation onto a surface with a randomized texture in a virtual environment for a set of repetitions. This may be accomplished as described above. For instance, the processor may drop the virtual 3D object for a set of repetitions. A repetition may be an example of an iteration of dropping the virtual 3D object.

In some examples, the computer-readable medium 442 may include code to cause the processor to randomize lighting in the virtual environment. In some examples, the lighting in the virtual environment may be randomized for each of the set of repetitions.

The image generation instructions 446 may include code to cause a processor to generate a 2D training image and a 2D annotation image from a random viewpoint for each of the repetitions. This may be accomplished as described above. For example, the processor may render a 2D training image and a 2D annotation image based on the landing position of the virtual 3D object in the virtual space.

The machine learning model provision instructions 448 may include code to cause a processor to provide a machine learning model that is trained based on the 2D training images and the 2D annotation images. This may be accomplished as described above. For instance, the processor may store the trained machine learning model in memory, may execute the machine learning model to perform a task (e.g., object detection, image classification, etc.), and/or may send the trained machine learning model to another device.

FIG. 5 is a diagram illustrating examples of 2D images 550a-c and corresponding annotation images 552a-c. A first 2D image 550a includes a first 3D object model 554a on a first surface 556a. The first 2D image 550a illustrates a first virtual space with random positioning of the first 3D object model 554a on a first surface 556a with randomized texture, lighting, and camera positioning that may be produced as described above. The first corresponding annotation image 552a illustrates the position of the first 3D object model 554a in the first 2D image 550a with a region of white pixels.

A second 2D image 550b includes a second 3D object model 554b on a second surface 556b. The second 2D image 550b illustrates a second virtual space with random positioning of the second 3D object model 554b on a second surface 556b with randomized texture, lighting, and camera positioning that may be produced as described above. The second corresponding annotation image 552b illustrates the position of the second 3D object model 554b in the second 2D image 550b with a region of white pixels.

A third 2D image 550c includes a third 3D object model 554c on a third surface 556c. The third 2D image 550c illustrates a third virtual space with random positioning of the third 3D object model 554c on a third surface 556c with randomized texture, lighting, and camera positioning that may be produced as described above. The third corresponding annotation image 552c illustrates the position of the third 3D object model 554c in the third 2D image 550c with a region of white pixels. In other examples of 2D images and corresponding annotation images, different colors, textures, camera positions, lighting, etc., may be utilized.

Some examples of the techniques described herein may be beneficial by producing images for machine learning model training automatically and/or synthetically, without manual image capture and/or without manual annotation. In some examples, a machine learning model may be automatically trained with a single input of 3D object model(s). For instance, some self-training approaches may enable utilizing a single input of 3D object model(s) to train a machine learning model or models. Some examples of the techniques described herein may reduce the difficulty and/or expense to train some machine learning models (e.g., object detectors, image classifiers, etc.) that may use large amounts of training data. In some examples, photorealistic or semi-photorealistic rendering may be utilized to model a virtual scene including the target 3D object model(s) and/or some context objects such as surfaces and distractors. Some examples of the techniques described herein may automatically and repetitively position the object(s) on top of surfaces and render images (e.g., screenshots) with corresponding annotated data. 3D object model orientation, camera position, textures, and/or lighting conditions may be varied to reduce biases in the data. For instance, automatic and/or random variation in texture for virtual scene components may be beneficial. In some examples, a procedure to automatically generate training images may be completed in a few hours on a workstation or desktop computer, which is less than weeks or months for manually acquiring and labeling data to reliably train a machine learning model (e.g., for pixel-wise detection such as segmentation).

Some examples of the techniques described herein may generate synthetic images to train an object detector that is able to detect real objects in images taken with a camera. It may be difficult to generate synthetic images that translate or relate well to real images taken from cameras. Some examples of the techniques described herein may address this issue by randomizing aspects of the virtual space, which may include varying parameters such as illumination, camera position, and/or textures, etc. Randomizing aspects of the virtual space (e.g., textures of floors, walls, and/or objects) may improve recognition rates for trained machine learning models. For instance, the trained machine learning models may exhibit improved robustness to variations in illumination, object pose, and/or background conditions.

Some examples of the techniques described herein may perform better than other approaches. For example, some approaches may render objects over background images, but may suffer from coarse blending with the background images, which may lead to reduced performance.

Some examples of the techniques may be beneficial for training machine learning models to perform object detection on textureless objects (e.g., industrial parts). For instance, some of the randomization techniques described herein may improve detection rates for textureless objects. In some examples, a parameter or parameters described herein (e.g., surface, texture, viewpoint positioning, 3D object model positioning, lighting, number of iterations, indoor or outdoor environment, camera-to-object distance, etc.) may be selected randomly or may be set based on a received input. For instance, the synthetic training images may be customized according to a target application (e.g., for indoor or outdoor environments, fixed or varied object textures and colors, fixed or varied camera-to-object distance, and/or other parameters).

While various examples of systems and methods are described herein, the systems and methods are not limited to the examples. Variations of the examples described herein may be implemented within the scope of the disclosure. For example, operations, functions, aspects, or elements of the examples described herein may be reordered, omitted, and/or combined.

The invention claimed is:

1. A method, comprising:
for a set of iterations, randomly positioning a three-dimensional (3D) object model in a virtual space having randomly selected textures;
for the set of iterations, rendering a two-dimensional (2D) image of the 3D object model in the virtual space and a corresponding annotation image; and
training a machine learning model using the rendered 2D images and corresponding annotation images.

2. The method of claim 1, further comprising, for the set of iterations, randomly positioning a viewpoint of the virtual space.

3. The method of claim 2, wherein randomly positioning the viewpoint comprises positioning a virtual camera in the virtual space at a random position that is pointing at the 3D object model.

4. The method of claim 3, further comprising validating that the virtual camera is within a boundary before rendering the 2D image.

5. The method of claim 1, wherein randomly positioning the 3D object model comprises positioning the 3D object model above a surface with a random orientation.

6. The method of claim 5, wherein randomly positioning the 3D object model comprises dropping the 3D object model onto the surface.

7. The method of claim 6, further comprising determining that a position of the 3D object model has stabilized before rendering the 2D image of the 3D object model.

8. The method of claim 1, further comprising, for the set of iterations, randomizing an illumination of the virtual space.

9. The method of claim 1, further comprising, for the set of iterations, selecting a surface.

10. The method of claim 1, further comprising providing, by a web service, the trained machine learning model.

11. An apparatus, comprising:
a memory; and
a processor coupled to the memory, wherein the processor is to:
generate a virtual space;
randomly select a texture for a surface in the virtual space;
randomly position a three-dimensional (3D) object model on the surface;
determine a position of a camera in the virtual space with a field of view that includes the 3D object model;
render a two-dimensional (2D) image from the position of the camera;
render an annotation image that indicates a location of the 3D object model in the 2D image; and
train a machine learning model using the 2D image and the annotation image.

12. The apparatus of claim 11, wherein the processor is to produce a user interface including a control to select the 3D object model, to establish a set of textures, or to select the virtual space.

13. The apparatus of claim 11, wherein the processor is to randomly position the 3D object model on the surface by calculating a fall of the 3D object model onto the surface from a random orientation above the surface.

14. A non-transitory tangible computer-readable medium storing executable code, comprising:
code to cause a processor to drop a virtual three-dimensional (3D) object from a random orientation onto a surface with a randomly selected texture in a virtual environment for a set of repetitions;
code to cause the processor to generate a two-dimensional (2D) training image and a 2D annotation image from a random viewpoint for each of the set of repetitions; and
code to cause the processor to provide a machine learning model that is trained based on the 2D training images and the 2D annotation images.

15. The computer-readable medium of claim 14, further comprising code to cause the processor to randomize lighting in the virtual environment.

* * * * *